July 11, 1933.  D. H. HILL  1,917,371
ROOST PREVENTER FOR POULTRY FOUNTAINS OR FEEDERS
Filed May 29, 1931  2 Sheets-Sheet 2
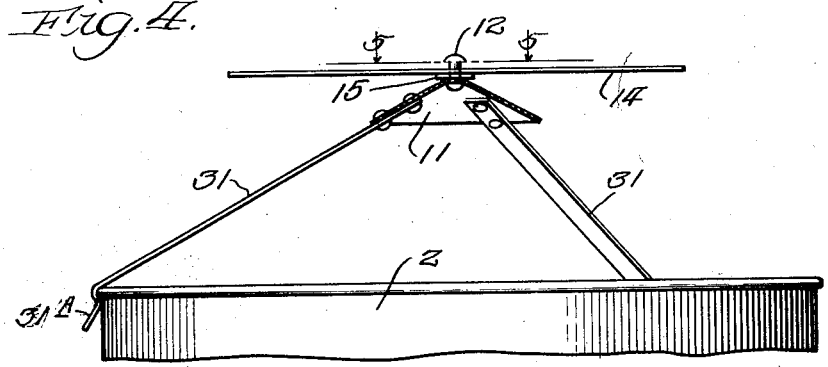
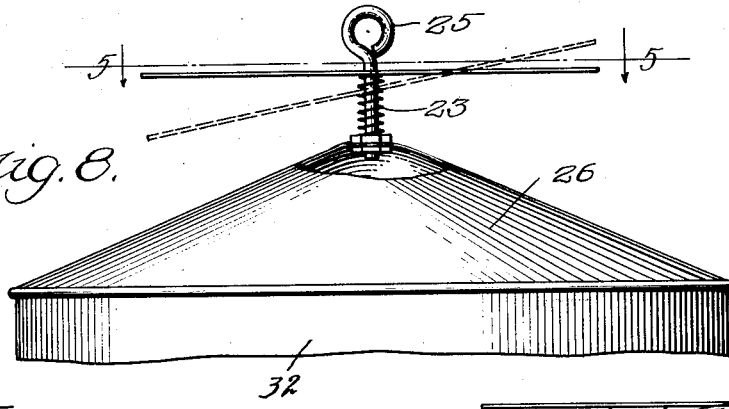
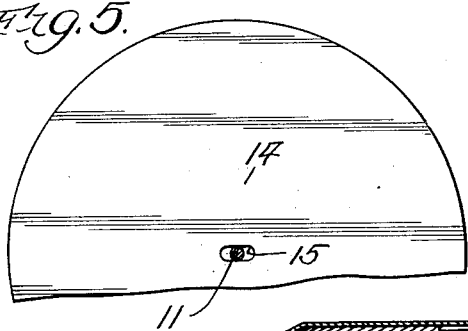
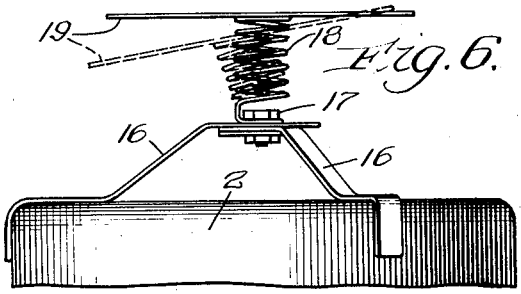
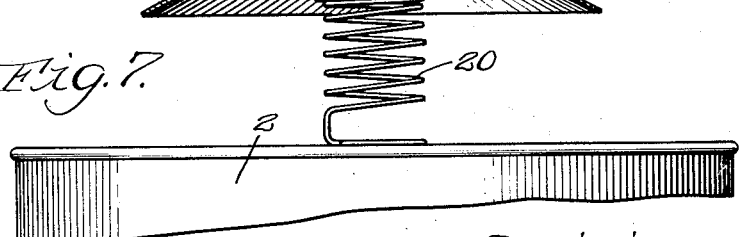
Inventor:
Dewey H. Hill Patented July 11, 1933

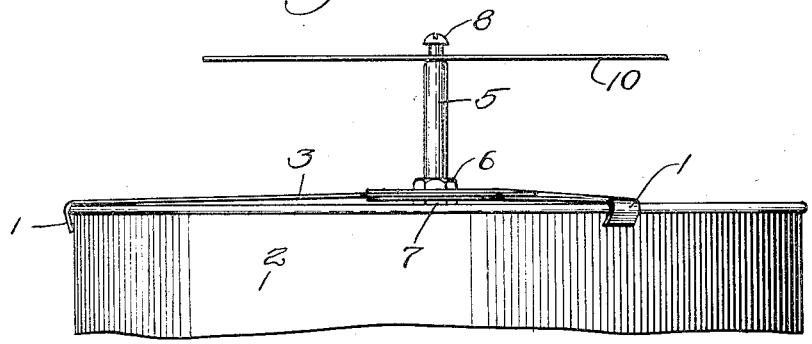
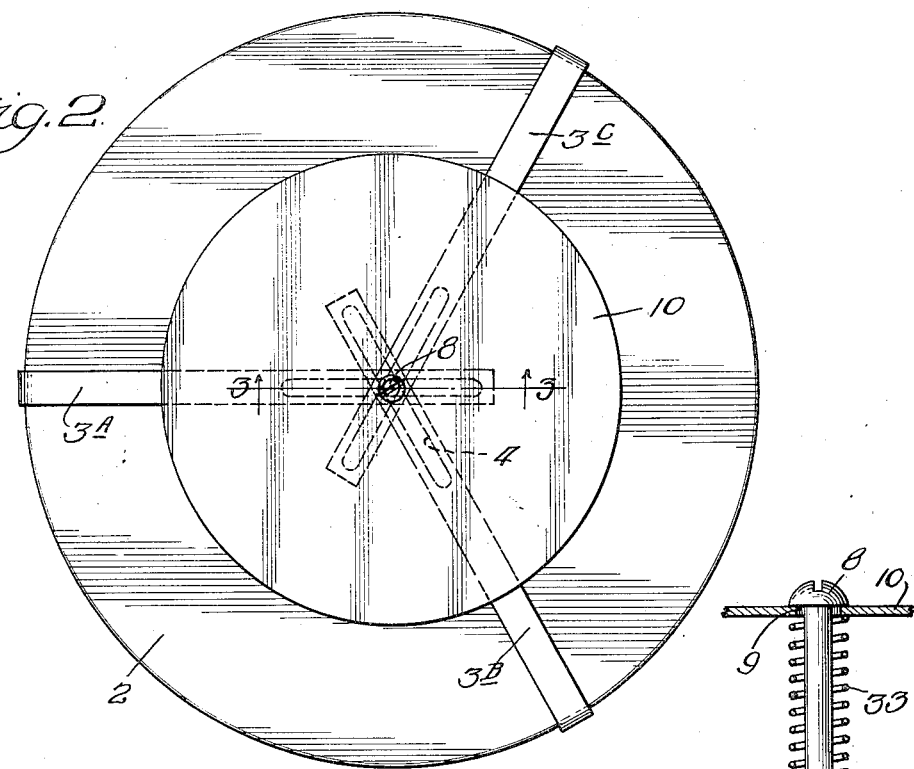
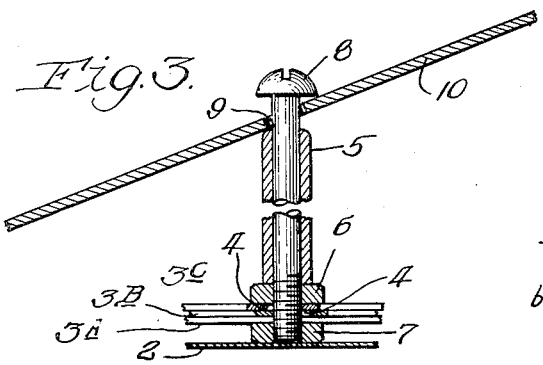
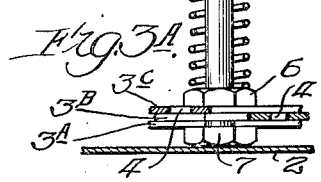

1,917,371

UNITED STATES PATENT OFFICE

DEWEY H. HILL, OF KOKOMO, INDIANA, ASSIGNOR TO GLOBE AMERICAN CORPORATION, OF KOKOMO, INDIANA, A CORPORATION OF INDIANA

ROOST-PREVENTER FOR POULTRY FOUNTAINS OR FEEDERS

Application filed May 29, 1931. Serial No. 540,928.

My invention relates to means for preventing chickens from roosting on the tops of poultry fountains and feeders, so as to eliminate the littering of the water or feed by chickens which are tempted to perch upon such fountain or feeder tops. Moreover, my invention aims to accomplish this general object by providing simple, inexpensive and durable means which can either be mounted permanently on the poultry fountains or feeders, or constructed so as to be attachable to such fountains or feeders.

According to the present practice, both poultry fountains and poultry feeders—particularly when built in small sizes suitable for use with young chicks—are commonly designed so that the container portion of such appliances can be detached for filling it, and the container portion usually has its container bottom substantially flat so that this bottom will seat firmly on a floor while the container is being filled. When the filled container is then attached in an inverted position to the base member into which the feed or water gradually flows from the container, this container bottom forms a flat top which tempts the larger chickens to roost on it.

To prevent such roosting, after the manner of my invention, I provide a platform normally disposed above the normally upward end of the container and of a sufficient area for preventing chickens from roosting on this container end; and I support this platform so that it will readily tilt when pressed down by the weight of a chicken attempting to roost on it, thereby causing the chicken to slide off the platform and scaring it from repeating such an attempt.

In a further aspect, my invention aims to provide a roost-preventer of the above recited type which can readily be attached to, and detached from a container, which can be adjusted to fit containers of different diameter, and which can readily be compacted for shipment.

Still further and more detailed objects of my invention will appear from the following specification and from the accompanying drawings in which Fig. 1 is an elevation of a detachable and adjustable roost-preventer embodying my invention, showing this as attached to the upper portion of a poultry fountain or feeder, and Fig. 2 is a plan view of the same.

Fig. 3 is an enlarged central and vertical section through the middle portion of the platform in Fig. 1, and through adjacent parts of the riser post and the tilt-limiting means.

Fig. 3A is a section showing an alternative type of platform support suitable for use with the adjustable attaching clamps of Figs. 1 and 2, namely one including a resilient support for the platform.

Fig. 4 is an elevation showing a non-adjustable type of detachable roost-preventer mounted on the upper portion of a container.

Fig. 5 is a fragmentary horizontal section taken along the line 5—5 of Fig. 4.

Fig. 6 is an elevation of a spring-supported roost-preventer detachably supported on the upper portion of a container.

Figs. 7 and 8 are elevations of spring-supported roost-preventers permanently attached to the upper portions of containers, with a part of the container broken away in Fig. 7.

In the embodiment of Figs. 1 to 3 inclusive, my roost-preventing attachment includes three metal strips, each of which has its outer end portion 1 curved downwardly to hook over a peripheral portion of the upper end of the container 2, while the major portions 3 of these strips extend radially of the container and lap over one another as shown in Fig. 3. These major strip portions (which extend substantially horizontally) desirably are each considerably longer than the radius of the upper end of the smallest container for which this roost-preventer is designed, and each strip has a longitudinal slot 4 in its inward portion.

Extending through these slots 4 in the superposed substantially horizontal portions 3A, 3B and 3C of the three strips is the lower end portion of a riser rod 5 carrying upper and lower nuts 6 and 7 between which the said three strip portions are clamped.

Threaded into the upper end of the riser 5 is a screw 8 which extends through the central perforation 9 in a platform constituted by a sheet metal disk 10, this perforation 9 being sufficiently larger in diameter than the shank of the screw so that it will permit a limited tilting of the platform after the manner shown in Fig. 3. With such a slotted arm arrangement, the arms can readily be slid inwardly (before the nuts are tightened) to insure a firm gripping of the container; and this slot provision also permits the same roost-preventing attachment to be used on containers of considerably different diameters. Moreover, by detaching the arms from the riser, the entire device can be packed quite compactly.

In practice, the height of the riser 5, the diameter of the platform 10, and the relative diameters of the platform perforation 9 and the shank of the screw 8 may be varied considerably. However, these parts preferably are so proportioned to the diameter of the upper end of the container that the platform will not permit a chicken to perch on the container, and so that the platform can tilt through a considerable angle. To save both metal and shipping weight, I desirably make the platform of a diameter considerably smaller than the diameter of the container top but larger than the radius of that top. Then I also desirably proportion the parts so that the platform cannot tilt sufficiently to strike against the top of the container.

When the container is to be refilled, the entire roost-preventing attachment can easily be lifted off the container, thereby permitting the latter to be inverted for filling it, and this attachment likewise can readily be snapped upon the container again after the latter is returned to its normal position.

Instead of using a rigid sleeve around the portion of the bolt 8 for supporting the platform 10, I may interpose a compression spring 33 between the platform and the nut 6, as shown in Fig. 3A. By doing this, I obtain a yielding platform-support which will be depressed by the weight of an alighting chicken, and which will violently toss the chicken off the platform.

When intended only for one size of container, I may employ a construction such as that shown in Figs. 4 and 5, which includes a sheet metal cone 11 fastened to downwardly diverging arms 31, each of which arms has its outer end portion 31A formed to hook over an edge portion of the top of the container 2. Extending upwardly through an axial perforation in the tip of the cone 11 is a rivet 12 which extends through a central perforation 15 in a platform 14.

A washer 15 may be interposed between the platform and the tip of the said cone, in which case the washer and the platform each have a central perforation which is larger (along at least one diameter) than the shank of the rivet 12, such as the slot 15 in Fig. 5. With this construction, the lower head of the rivet 12 is desirably welded to the cone; and the rivet has a shank of such length that the upper rivet head is freely spaced from the top of the platform when the latter is horizontal, thereby permitting the needed tilting of the platform.

Fig. 6 shows still another detachable type of roost-preventer, namely one including three radial arms 16 connected by a bolt 17 which bolt also clamps the lower end of a normally upright spiral spring 18 to the bolt-connected arm parts, the upper end of the spring being secured to a platform 19. For a permanent mounting on a container, a similar spring 20 may be fastened at its lower end to the top of the container as in Fig. 8 and may have its upper end fastened to a platform 21, as shown in Fig. 7, which figure also shows that the platform need not be flat in its entirety. With the arrangement of either Fig. 6 or Fig. 7, the tilting action will be accomplished by a bending of the axis of the spring, owing to the fact that a chicken (particularly when alighting on a platform) cannot balance itself axially of the spring.

Fig. 8 shows an embodiment allied to that of Fig. 1, but not manually detachable from the container 32. In this case, the platform 22 is supported by a spring 23 which rests on the upper of two nuts 24 which clamp an eye-bolt 25 to the top 26 of the container, and the eye at the upper end of the bolt prevents the platform from being lifted or flipped off the bolt. With this embodiment, an alighting of a chicken on the platform will somewhat compress the spring while also tilting the platform, as for example to the position shown in dotted lines; and a similar action will occur with the arrangement of Fig. 3A.

With the embodiments of Figs. 1 and Fig. 4, alighting of a chicken on the platform will not depress the central portion of the platform, but will cause the platform to tilt about a stationary fulcrum, while with the spring type embodiments of Figs. 6, 7 and 8, the platform will be both tilted and depressed by the weight of the chicken. However, the result with each embodiment will be that of causing the chicken to slide or flop off the platform with such suddenness as to scare the fowl from again attempting such a roosting. Consequently, my simple and inexpensive arrangement is highly effective for preventing the older chickens from perching where they would litter the feed or water for the young chicks, and also for scaring these older chickens away from the supply intended for the chicks. Moreover, with the embodiments of Figs. 1 to 4 inclusive, the alighting of a chicken on the platform usually also will rotate the platform somewhat about the axis of the supporting member on which the platform rests, and with the embodiments of Figs. 6, 7 and 8, the rebound of the spring will forcibly toss the chicken off the platform, thereby frightening the chicken all the more.

However, while I have illustrated my roost-preventing means in connection with containers having tops of circular contour, I do not wish to be limited in this respect nor as to other details of the construction and arrangement above disclosed, since many other changes might be made without departing either from the spirit of my invention or from the appended claims.

I claim as my invention:

1. Means for preventing the roosting of fowl on the top of a chick fountain or the like, comprising a riser structure carried by the fountain and presenting an upwardly facing shoulder substantially coaxial with and spaced upwardly from the top of the fountain, a pivot stem projecting upwardly from the said shoulder, and a normally substantially horizontal disk having its central portion resting upon the said shoulder and having a central perforation loosely housing the stem.

2. Means for preventing fowl from roosting on the top of a chick fountain or the like, comprising a pivoting structure seated upon the said fountain top and having fingers engaging circumferentially spaced side portions of the fountain, a normally substantially horizontal disk having its central portion seated on and disposed for rocking upon the said pivoting structure, the pivoting structure having a part thereof disposed for limiting the movements of the disk with respect to the pivoting structure.

3. Means for preventing the roosting of fowl on the top of a chick fountain or the like, comprising a normally approximately horizontal disk spaced upwardly from the top of the fountain and having its axis approximately coaxial with the fountain, and riser means supporting the disk from the fountain with freedom for tilting movements of the disk about the center of the disk, the riser means being formed for limiting the extent of such tilting.

4. Means for preventing the roosting of fowl on the top of a chick fountain or the like, comprising a substantially circular and normally approximately horizontal disk, and means rotatably supporting the disk with the center of the disk spaced upwardly from the center of the top of the fountain and with freedom for both rotating and tilting movements of the disk, the said means being also arranged for limiting the extent of the tilting.

5. Means for preventing fowl from roosting on the top of a chick fountain or the like, comprising a pivoting structure seated upon the said top; the structure presenting an upwardly facing annular shoulder spaced upwardly from the center of the said top, and including an upright pivot pin extending upwardly from and of smaller diameter than the said shoulder; and a normally approximately horizontal platform seated upon the said shoulder and having a central aperture through which the said pin extends, the aperture being sufficiently larger in diameter than the pin to permit a limited tilting of the platform upon the said shoulder in any direction with respect to the axis of the pin.

6. Roost-preventing means as per claim 3, in which the supporting means comprise a plurality of arms all fastened to and radiating from the said stem; each of the arms having a part thereof seated on the said top, and having its outer end portion bent downward and engaging a side wall of the container.

7. Means for preventing fowl from roosting on the top of a chick fountain or the like, comprising a pivoting structure seated upon the said top, and a normally substantially horizontal disk having its central portion seated upon and disposed for rocking on a part of the pivoting structure; the pivoting structure including a plurality of diverging arms each of which has a portion of the arm seated on the said top and another portion engaging an upper side part of the fountain.

8. Means for preventing fowl from roosting on the top of a chick fountain or the like, comprising a pivoting structure seated upon the said top, and a normally substantially horizontal disk having its central portion seated upon and disposed for rocking on a part of the pivoting structure; the pivoting structure including a plurality of arms radiating from the said central portion and each having an arm part seated on the fountain, the arms being longitudinally slidable with respect to the said central portion, and means for latching the arms against sliding.

9. In combination with the cover of a poultry watering device, a disk overlying the cover, means interposed between the disk and the cover forming a pivotal point permitting depression of the disk in any direction, and connecting means securing the disk to the cover for swiveling motions.

10. A poultry waterer having an arched cover element, an anti-roost element overlying said cover, and means connecting the elements in a manner to condition the anti-roost element for swiveling and rocking motions toward and away from the cover.

Signed at Kokomo, Indiana, May 22nd, 1931.

DEWEY H. HILL.